US011982647B2

United States Patent
Berberig et al.

(10) Patent No.: US 11,982,647 B2
(45) Date of Patent: May 14, 2024

(54) ULTRASONIC MEASURING DEVICE

(71) Applicant: Endress+Hauser Flowtec AG, Reinach (CH)

(72) Inventors: Oliver Berberig, Grenzach-Wyhlen (DE); Jens Rautenberg, Geseke (DE); Beat Kissling, Reinach (CH); Sascha Grunwald, Steinen (DE); Rudolf Braun, Ahorn (DE); Achim Stark, Dörfles/Esbach (DE); Klaus Beringer, Untersiemau (DE); Stefan Rüger, Jena (DE); Theo Gerald Hofmann, Jena (DE)

(73) Assignee: Endress+Hauser Flowtec AG, Reinach (CH)

( * ) Notice: Subject to any disclaimer, the term of this patent is extended or adjusted under 35 U.S.C. 154(b) by 421 days.

(21) Appl. No.: 17/414,423

(22) PCT Filed: Dec. 10, 2019

(86) PCT No.: PCT/EP2019/084423
§ 371 (c)(1),
(2) Date: Jun. 16, 2021

(87) PCT Pub. No.: WO2020/126671
PCT Pub. Date: Jun. 25, 2020

(65) Prior Publication Data
US 2022/0091072 A1 Mar. 24, 2022

(30) Foreign Application Priority Data
Dec. 20, 2018 (DE) ...................... 10 2018 133 066.9

(51) Int. Cl.
*G01N 29/24* (2006.01)
*G01F 1/66* (2022.01)
(Continued)

(52) U.S. Cl.
CPC ..... *G01N 29/2437* (2013.01); *G01N 29/4463* (2013.01); *G01N 2291/02809* (2013.01);
(Continued)

(58) Field of Classification Search
CPC ........................... G01N 29/4463; G01F 1/668
See application file for complete search history.

(56) References Cited

U.S. PATENT DOCUMENTS

| 4,098,117 A * | 7/1978 | Baumoel | G01F 1/662 |
| | | | 73/216 |
| 4,754,650 A * | 7/1988 | Smalling | G01N 29/024 |
| | | | 73/861.28 |

(Continued)

FOREIGN PATENT DOCUMENTS

| CN | 105264339 A | 1/2016 |
| CN | 108871476 A | 11/2018 |

(Continued)

*Primary Examiner* — Daniel J Colilla
(74) *Attorney, Agent, or Firm* — Christopher R. Powers; Endress+Hauser (USA) Holding, Inc.

(57) ABSTRACT

An ultrasound instrument for detecting a measured value of a medium includes a measurement chamber having a chamber wall and a longitudinal axis; a pair of ultrasound transducers configured to transmit ultrasound signals along a signal path between ultrasound transducers of the pair through the measurement chamber and to receive ultrasound signals, wherein the signal path includes a signal reflection on a reflection surface, wherein the chamber wall in a region of the reflection surface opposite a first chamber side is configured to prevent a reflection of an ultrasound signal on a chamber outer surface of the chamber wall in the direction of the signal path, wherein the chamber wall has, in the region of the reflection surface, a maximum wall thickness which is at least a factor of 1.5 greater than a Rayleigh (Continued)

Fig. 1 wavelength, associated with a central frequency, of the ultrasound signal in the chamber wall.

21 Claims, 7 Drawing Sheets

(51) Int. Cl.
*G01F 1/86* (2006.01)
*G01N 29/024* (2006.01)
*G01N 29/44* (2006.01)

(52) U.S. Cl.
CPC .............. *G01N 2291/02818* (2013.01); *G01N 2291/0423* (2013.01); *G01N 2291/0427* (2013.01)

(56) References Cited

U.S. PATENT DOCUMENTS

| | | |
|---|---|---|
| 2011/0132102 A1 | 6/2011 | Ueberschlag |
| 2011/0271769 A1 | 11/2011 | Kippersund |
| 2015/0160053 A1* | 6/2015 | Baumoel ................. G01F 1/668 73/861.28 |
| 2016/0153816 A1 | 6/2016 | Hayashi |
| 2018/0180461 A1 | 6/2018 | van Klooster et al. |
| 2019/0331642 A1* | 10/2019 | Fuchs .................. G01N 29/022 |
| 2021/0270648 A1* | 9/2021 | Müller .................... G01F 1/662 |

FOREIGN PATENT DOCUMENTS

| | | | |
|---|---|---|---|
| DE | 3911408 A1 | 10/1990 | |
| DE | 3911408 C2 | 1/1998 | |
| DE | 202015104291 U1 | 1/2016 | |
| DE | 102016015129 A1 | 6/2018 | |
| DE | 102017004038 A1 | 8/2018 | |
| DE | 102019110514 A1 | 10/2019 | |
| DE | 102019112332 A1 | 12/2019 | |
| EP | 0212470 A2 | 3/1987 | |
| EP | 0922937 A2 | 6/1999 | |
| EP | 2343548 A2 * | 7/2011 | ........... G01N 29/024 |
| GB | 2479115 A | 10/2011 | |
| JP | 2010181321 A * | 8/2010 | |
| WO | 2008034878 A2 | 3/2008 | |
| WO | 2010034713 A2 | 4/2010 | |
| WO | 2018072926 A1 | 4/2018 | |

\* cited by examiner

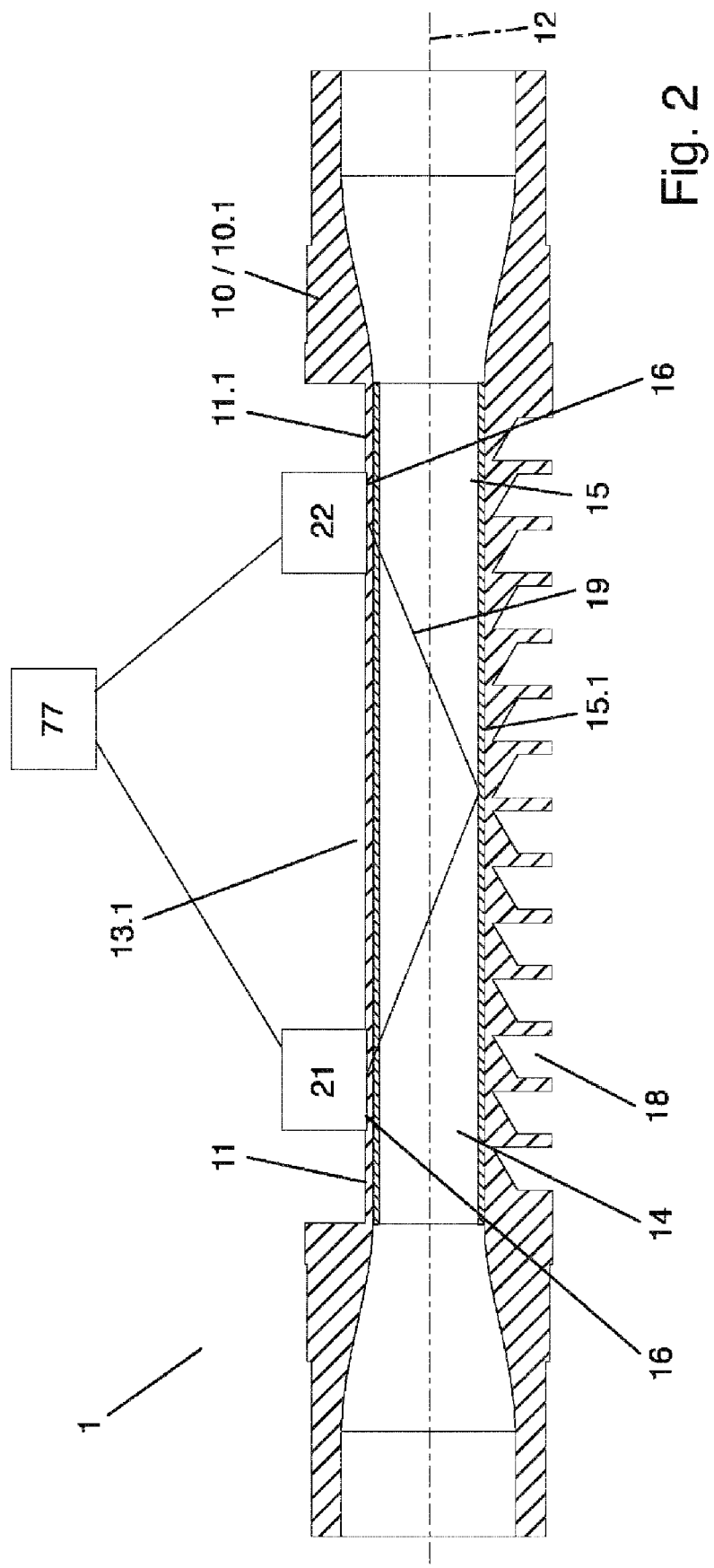

ULTRASONIC MEASURING DEVICE

CROSS-REFERENCE TO RELATED APPLICATIONS

The present application is related to and claims the priority benefit of German Patent Application No. 10 2018 133 066.9, filed on Dec. 20, 2018, and International Patent Application No. PCT/EP2019/084423, filed on Dec. 10, 2019, the entire contents of which are incorporated herein by reference.

TECHNICAL FIELD

The invention relates to an ultrasonic measuring device for detecting a measurand of a medium located in a measurement chamber.

BACKGROUND

Ultrasonic measuring devices for detecting measurands are prior art. For example, WO 2008034878A2 shows an ultrasonic measuring device with which ultrasonic transducers generate Lamb waves in a measuring tube wall, which lead to an emission of ultrasound signals into a measuring tube filled with a medium. These ultrasonic signals can be directed via one or more reflections at a measuring tube inner wall to an ultrasonic transducer intended for reception. However, it has been found that, in addition to the reflections of ultrasonic signals at the measuring tube wall in the region of the reflection sites, additional Lamb waves or reflections occur at an outer wall that interfere with the ultrasonic signals in a disturbing manner, so that the reception of the ultrasonic signal or the evaluation of the ultrasonic signal is made more difficult.

SUMMARY

The object of the invention is to provide an ultrasonic measuring device with which signal quality is improved.

The object is achieved by an ultrasonic measuring device according to the present disclosure.

An ultrasonic measuring device according to the invention for detecting a measurand of a medium located in a measurement chamber comprises:
the measurement chamber having a measurement chamber wall and a measurement chamber longitudinal axis;
at least one pair of ultrasonic transducers arranged on a first measurement chamber side of the measurement chamber, wherein the ultrasonic transducers of a pair are configured to transmit ultrasound signals along an ultrasonic signal path between the ultrasonic transducers of the pair through the volume of the measurement chamber and to receive ultrasound signals, wherein the ultrasound signals have a central frequency,
wherein an ultrasonic signal path through the volume of the measurement chamber comprises at least one ultrasound signal reflection on at least one reflection surface, wherein a reflection surface is arranged on an inner measurement chamber surface of the measurement chamber wall opposite the first measurement chamber side,
wherein the measurement chamber wall in the region of the reflection surface opposite the first measurement chamber side is configured to prevent a reflection of an ultrasonic signal of a measurement chamber outer surface of the measurement chamber wall in the direction of the ultrasonic signal path,
wherein the measurement chamber wall has, in the region of the reflection surface, a maximum wall thickness that is at least a factor of 1.5 and in particular at least a factor of 2, and preferably at least a factor of 2.5, greater than a Rayleigh wavelength, associated with the central frequency, of the ultrasound signal in the measurement chamber wall.

In this way, an interfering influence by the Rayleigh waves in the medium of generated ultrasonic signals on an ultrasound signal reflected at the reflection surface can be reduced.

In one embodiment, the at least one pair of ultrasonic transducers is arranged on an outer side of the measurement chamber,
wherein the ultrasonic transducers of a pair are configured to transmit and receive ultrasonic signals by means of Lamb waves or plate waves in the transition region to Rayleigh waves in the measurement chamber wall, wherein the ultrasonic transducers are configured to excite and/or detect the Lamb waves or plate waves in a coupling region of the measurement chamber wall by means of at least one converter element.

In one embodiment, the measurement chamber outer surface has at least one indentation in the region of the reflection surface, wherein indentation surfaces are non-parallel to the reflection surface,
wherein the entirety of the at least one indentation has a width that corresponds at least to a width of the reflection surface multiplied by a factor F1, wherein F1 is greater than 0.7 and in particular is greater than 0.8 and preferably greater than 0.9.

Consequently, ultrasonic waves entering the measuring tube wall can be deflected in a direction other than a direction of the ultrasonic signal path.

In one embodiment, the outer surface has a plurality of indentations, wherein indentations run in particular parallel to one another.

In one embodiment, a first group of indentations run parallel to one another, and a second group of indentations run parallel to one another, wherein indentations of the first group are non-parallel to indentations of the second group, wherein an orientation of the first group has an angle of at least 20° to an orientation of the second group.

In one embodiment, the at least one indentation has, at least sectionally, a depth of at least one wavelength of an ultrasonic signal in the measuring tube wall relative to the central frequency,
and/or wherein an offset of two adjacent indentations is less than one wavelength of an ultrasonic signal in the measuring tube wall.

In one embodiment, the measurement chamber wall or a measurement chamber wall surface of the measurement chamber wall is produced at least sectionally from an ultrasound signal-absorbing material.

Consequently, an intensity of ultrasonic waves that, after being reflected at the measurement chamber outer surface, continue in the direction of the measurement chamber, can thereby be reduced.

In one embodiment, the measurement chamber wall has a chamber structure, wherein the chamber structure is produced by using different materials, wherein a first material is characterized by the measurement chamber wall and, for example, is a plastic or a metal or a ceramic, and wherein at least one second material is a material from the following list:

gas, in particular air, plastic, metal, gel, foam, aerogel, a vacuum, a composite with, for example, hollow glass spheres, or heavy metal powder or heavy metal oxide powder.

In one embodiment, the measurement chamber wall has a dissonant structure arranged on the surface in the region of the reflection surface are embedded in the measurement chamber wall, which is configured to impede the generation of Rayleigh waves in the region of the first reflection surface.

In one embodiment, the dissonant structure comprises periodically or quasi-periodically spatially varying acoustic impedances in the direction of a measurement chamber longitudinal axis.

In one embodiment, the varying acoustic impedances are produced by using different materials, wherein a first material is characterized by the measurement chamber wall and, for example, is a plastic or a metal or a ceramic, and wherein at least one second material is a material from the following list:

gas, in particular air, plastic, metal, gel, foam, aerogel, a vacuum, a composite with, for example, hollow glass spheres, or heavy metal powder or heavy metal oxide powder.

In one embodiment, the at least one converter element is a piezoelectric element that is mechanically connected to the measurement chamber, or wherein the ultrasonic transducer has a coupling element with a first side facing away from the measurement chamber and a second side facing the measurement chamber, wherein the at least one converter element is arranged on the first side of the coupling element, and wherein the coupling element is mechanically connected to the measurement chamber by means of the second side, or wherein the converter element comprises a coil device, wherein the measurement chamber comprises or bears a magnetostrictive material in the coupling regions, wherein the coil device is configured to generate and/or detect a deflection of the measurement chamber wall by means of the magnetostrictive material.

In one embodiment, the piezoelectric element or the coupling element or the magnetostrictive material is connected to the measurement chamber by means of a glued, soldered or welded connection or via a releasable connection.

In one embodiment, the measurement chamber can be inserted in a medium-tight manner into a container containing the medium via an opening in the container, or the measurement chamber is a measuring tube.

In one embodiment, the ultrasonic measuring device is configured to measure at least one of the following media properties:

volume flow, mass flow, density, viscosity, acoustic damping, sound velocity, concentration of at least one media component, acoustic dispersion, and measurands derived therefrom.

BRIEF DESCRIPTION OF THE DRAWINGS

The invention will now be described with reference to exemplary embodiments.

FIG. 2 shows an exemplary ultrasonic measuring device according to the present disclosure with a measuring tube;

DETAILED DESCRIPTION

Figure 1:
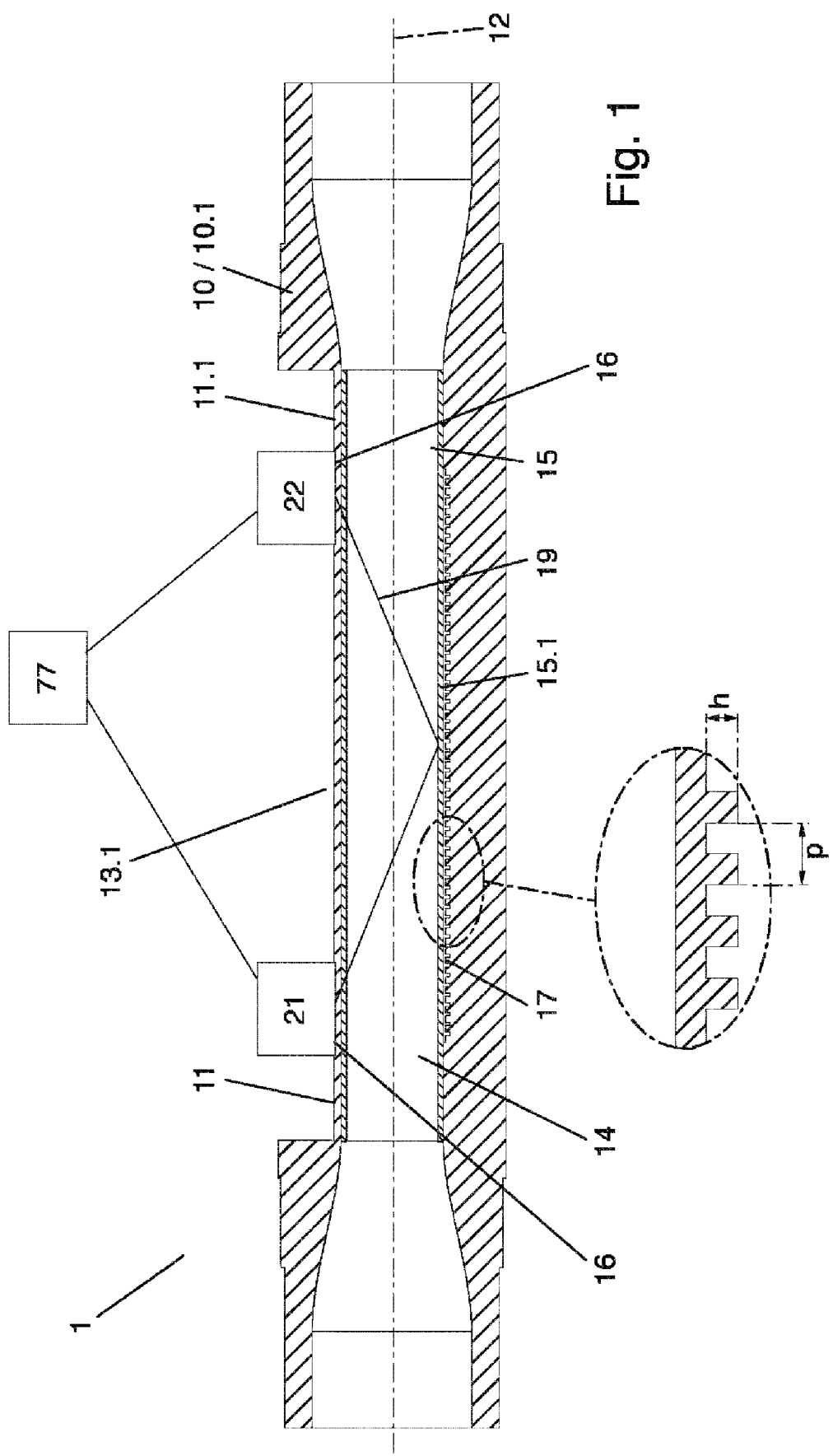
FIG. 1 shows an exemplary ultrasonic measuring device according to the present disclosure with a measuring tube.

FIG. 1 shows a longitudinal section of a measurement chamber 10 of an ultrasonic measuring device 1 according to the invention with a measurement chamber 10 designed as measuring tube 10.1 with a pair of ultrasonic transducers 21, 22, which are mounted on a measurement chamber wall surface 11.1 of the measurement chamber wall 11 on a first measurement chamber side 13.1, and an electronic measuring/operating circuit 77, which is configured to operate the ultrasonic transducers and evaluate measurement signals generated by means of the ultrasonic transducers and to provide measured values of measurands. The measurement chamber is configured to contain or guide a medium.

The ultrasonic transducers are configured to transmit ultrasonic signals along an ultrasonic signal path 19 between the ultrasonic transducers of the pair through the volume of the measurement chamber 14 and to receive ultrasonic signals, wherein the ultrasonic signals have a central frequency, wherein the ultrasonic signal path have at least one reflection at a reflection surface 15.1, which is arranged on a side of the measurement chamber opposite the first measurement chamber side.

The ultrasonic transducers 21, 22 of a pair are configured to transmit and receive ultrasonic signals for example by means of Lamb waves or plate waves in the transition region to Rayleigh waves in the measurement chamber wall, wherein the ultrasonic transducers are configured to excite and/or detect the Lamb waves or plate waves in a coupling region 16 of the measurement chamber wall by means of at least one converter element 23 (see FIG. 4). Alternatively, the ultrasonic transducers can also be integrated into the measurement chamber wall and be in contact with the medium.

Reflections of ultrasonic signals at a boundary surface usually lead to partial coupling of ultrasound from a first medium into a second medium, so that a portion of the ultrasonic signal enters the measurement chamber wall from the medium inside the measurement chamber. If the measurement chamber has a wall thickness in the region of the reflection surface that is greater than a Rayleigh wavelength belonging to the ultrasonic signal component in the measurement chamber wall, then coupling the ultrasound signal component into the measurement chamber wall can lead to a formation of Rayleigh waves or plate waves in the transition region between Lamb waves and Rayleigh waves in the measurement chamber wall 11 in the region of the reflection surface 15.1. These formed Rayleigh waves or plate waves in turn couple ultrasound into the measuring tube, which temporally and/or spatially interferes with the ultrasound with the ultrasonic signals traveling along the ultrasonic signal path 19. This can make it more difficult to evaluate the ultrasound signals traveling along the ultrasonic signal path 19. Moreover, coupling the ultrasound into the measurement chamber wall leads to an energy loss of the ultrasound signal in the measurement chamber volume.

Coupling the ultrasonic signal component into the measurement chamber wall moreover leads to reflection of ultrasound at an outer side of the measurement chamber wall, so that the reflected ultrasound can penetrate into the volume of the measurement chamber.

According to the invention, the measurement chamber in the region of the reflection surface is configured to impede the excitation of Rayleigh waves. This can be accomplished by means of a dissonant structure 17 as shown in FIG. 1. The dissonant structure is located on an outer side of the measuring tube, but can also be integrated in the measurement chamber wall. The dissonant structure has a periodic or quasi-periodic sequence of spatially varying acoustic impedances in the direction of a measurement chamber longitudinal axis 12, wherein the varying acoustic impedances are produced by using different materials, wherein a first material is characterized by the measurement chamber wall 11 and, for example, is a plastic or a metal or a ceramic, and wherein at least one second material is a material from the following list: Gas, in particular air, plastic, metal, gel, foam, aerogel, a vacuum, a composite with, for example, hollow glass spheres, or heavy metal powder or heavy metal oxide powder. A spatial periodicity p of the spatially varying acoustic impedances is adapted to the employed ultrasonic signals such that ultrasonic waves reflected at edges of the dissonant structure interfere destructively, and again coupling ultrasound into the measurement chamber is therefore made more difficult. The dissonant structure can be cast or encapsulated on the measuring tube outlet side.

Coupling the ultrasonic signal component into the measurement chamber wall moreover leads to a reflection of ultrasound at an outer side of the measurement chamber wall, so that the reflected ultrasound can penetrate back into the volume of the measurement chamber and, at that location, can interfere temporally and/or spatially with the ultrasound signals traveling along the ultrasonic signal path 19.

FIG. 2 shows a longitudinal section of a measurement chamber of an ultrasonic measuring device 1 according to the invention, wherein the measurement chamber configured as measuring tube 10.1 has a chamber structure 18 in the region of the reflection surface 15.1 on the outer side of the measurement chamber wall, wherein the chamber structure is produced by using different materials, wherein a first material is characterized by the measurement chamber wall and is for example a plastic or a metal or a ceramic, and wherein at least one second material is a material from the following list: Gas, in particular air, plastic, metal, gel, foam, aerogel, a vacuum, a composite with, for example, hollow glass spheres, or heavy metal powder or heavy metal oxide powder. The second material is configured to absorb ultrasound in the measurement chamber wall, so that again coupling into the volume of the measurement chamber or measuring tube is not possible. Instead of a chamber structure, an absorbent material can also be uniformly applied on the outside of the chamber. Alternatively, the chamber structure can also be closed to the outside.

Figure 3C:
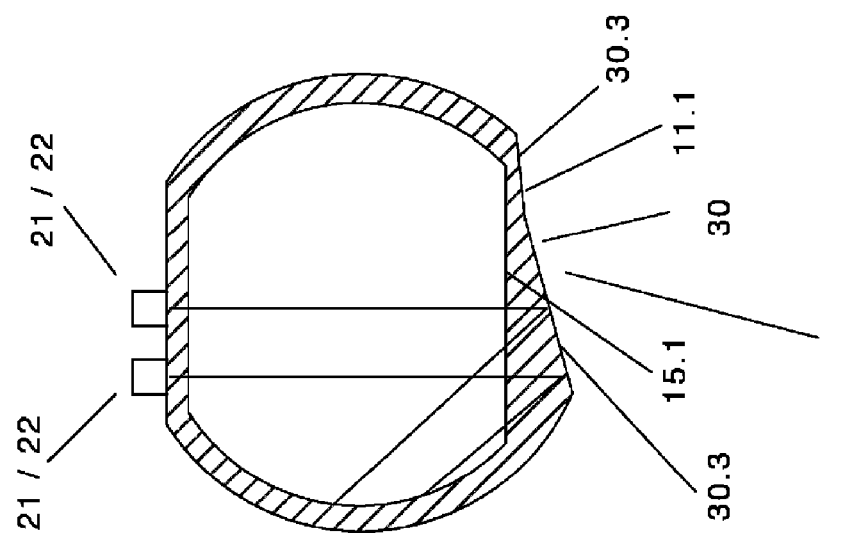
FIGS. 3a-3c show cross-sections according to the present disclosure of exemplary measurement chambers according to the present disclosure.
Figure 3B:
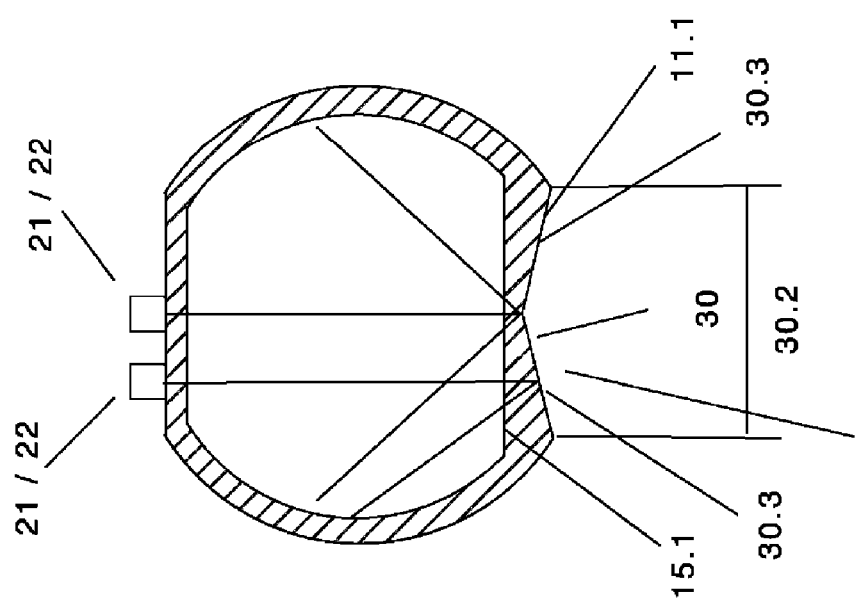
Figure 3A:
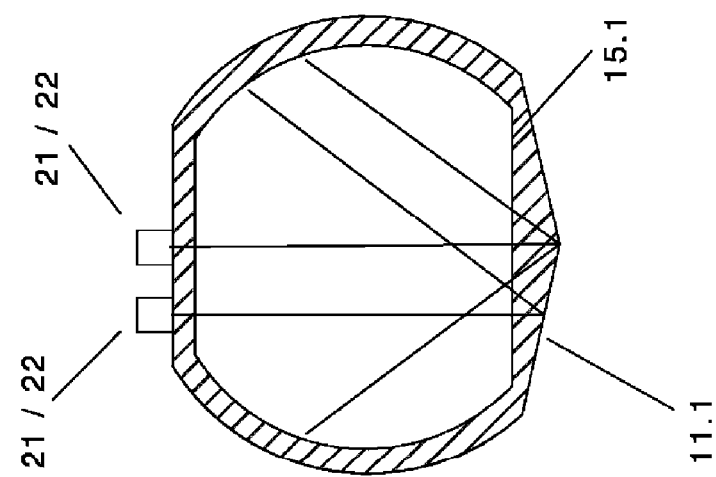

FIGS. 3a) to c) schematically depict exemplary measurement chamber cross-sections according to the invention that can be configured alternatively or in addition to the dissonant structure shown in FIG. 1. In the region of the reflections, the measurement chamber wall surface 11.1 has at least one indentation 30 parallel to the measurement chamber longitudinal axis with indentation surfaces 30.3, which indentations laterally reflect ultrasound entering the measurement chamber wall. In this way, an interfering interaction with ultrasound signals traveling along an ultrasonic signal path can be at least mitigated. The entirety 30.1 of the at least one indentation has a width 30.2 that, in a measuring chamber cross-section, corresponds at least to a width of the reflection surface multiplied by a factor F1, wherein F1 is greater than 0.7 and in particular is greater than 0.8 and preferably greater than 0.9. This can prevent reflection of ultrasound toward an ultrasonic transducer 21, 22.

Figure 4A:
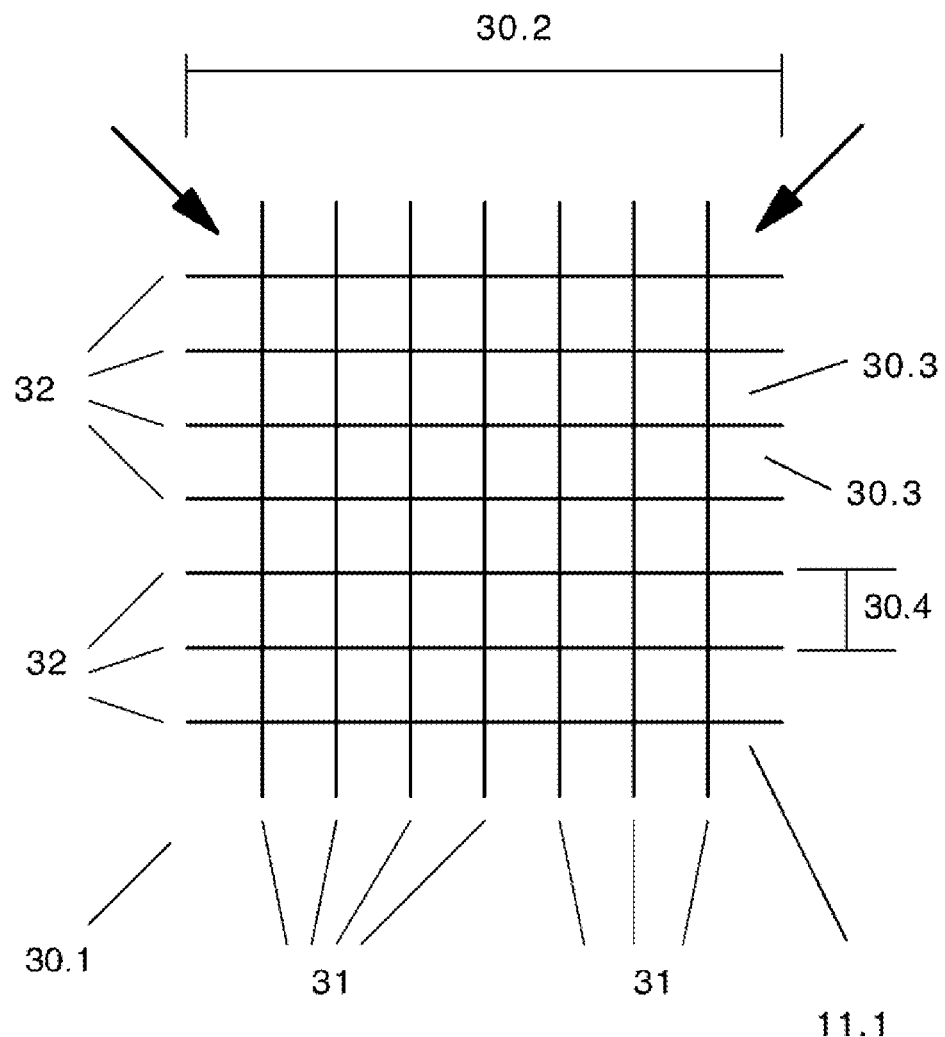
FIG. 4a shows a schematic of groups of indentations in a chamber wall surface of an embodiment of a measurement chambers according to the present disclosure.
Figure 4B:
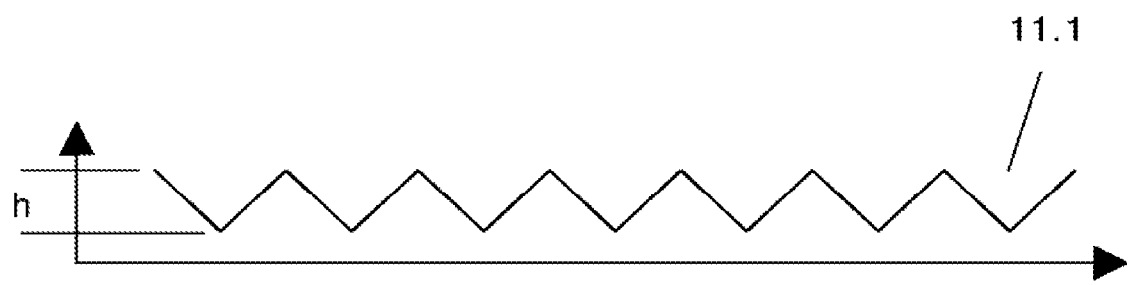
FIG. 4b shows an exemplary outer contour according to the present disclosure of a measurement chamber in the region of the reflection surface.

FIGS. 4a) and b) schematically illustrate a further exemplary possibility according to the invention of structuring the measurement chamber wall surface in the region of the reflection surface at least sectionally by means of indentations, wherein a first group of indentations 31 run parallel to one another, and wherein a second group of indentations 32 run parallel to one another, wherein indentations of the first group are non-parallel to indentations of the second group, wherein an orientation of the first group is at an angle of at least 20° to an orientation of the second group. The offset 30.4 between adjacent indentations of the first group or of the second group is smaller than a transverse wavelength, and in particular smaller than half a transverse wavelength of the ultrasound to be used in the measurement chamber wall. A height h of the indentation (see FIG. 4b)) is preferably at least half the transverse wavelength of the ultrasound to be used in the measurement chamber wall. The indentations can be filled with a material that, for example, acts in an acoustically damping manner. The height profile shown in FIG. 4b) runs, for example, in the direction of the arrows. The entirety 30.1 of the at least one indentation has a width 30.2 that, in a measuring chamber cross-section, corresponds at least to a width of the reflection surface multiplied by a factor F1, wherein F1 is greater than 0.7 and in particular is greater than 0.8 and preferably greater than 0.9. This can prevent reflection of ultrasound toward an ultrasonic transducer 21, 22.

Ultrasound that contacts the notches according to FIGS. 4a) and b) experiences a continuously changing acoustic index, so that ultrasound reflected at the indentations is temporally washed out and shifted to lower frequencies. As a result, the ultrasound along the ultrasonic signal path can no longer interfere with propagating ultrasonic signals.

Figure 5A:
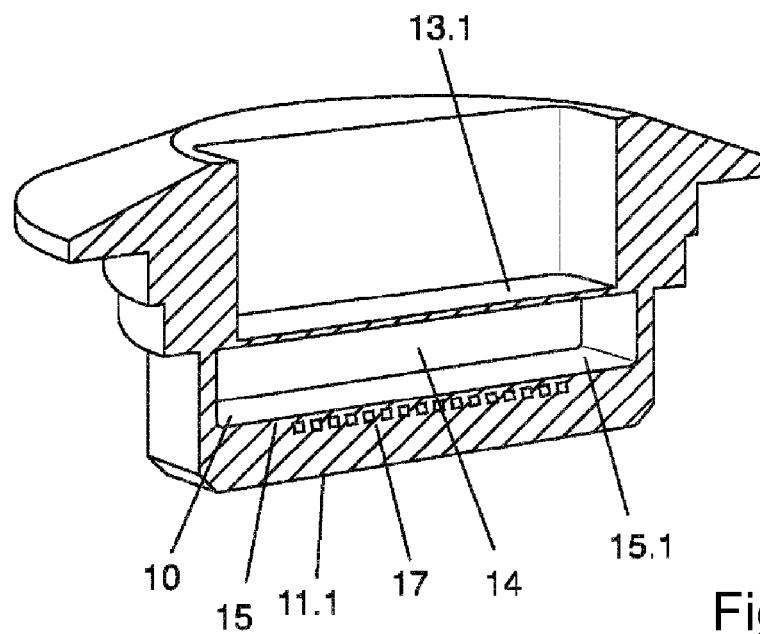
FIG. 5a shows a cross-sectional perspective view of an exemplary ultrasonic measuring device according to the present disclosure with a measurement chamber that can be inserted into a container.
Figure 5B:
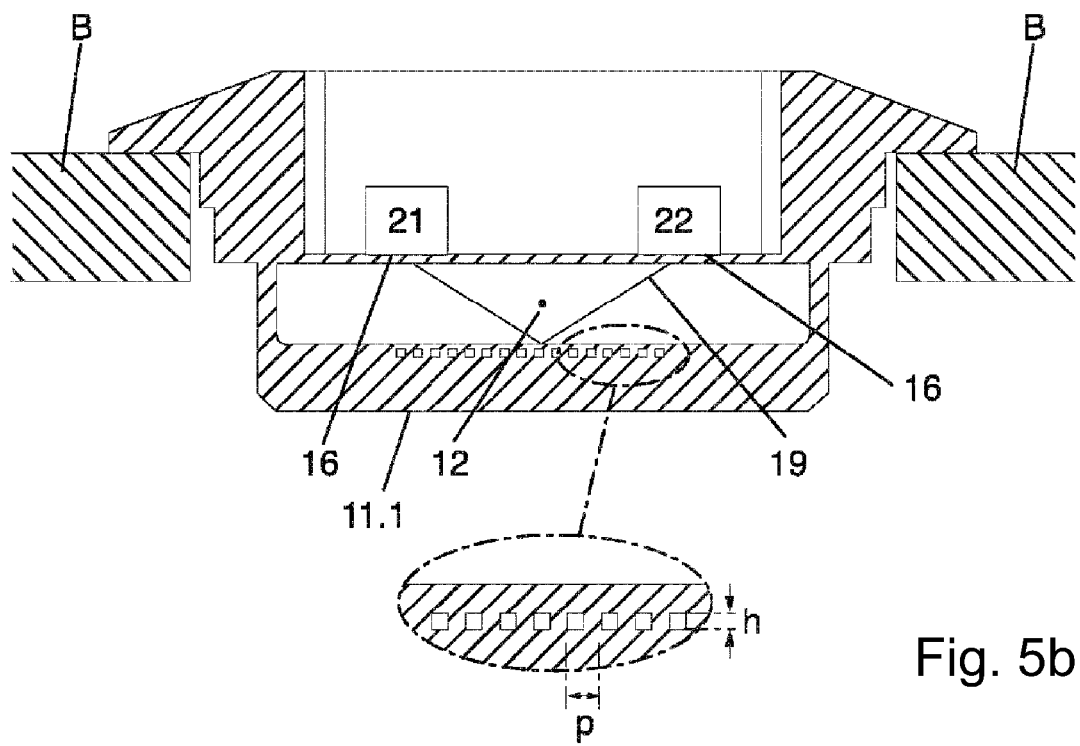
FIG. 5b shows a cross-section of an embodiment of the present disclosure inserted into a container, including a detail view of a dissonant structure of a measurement chamber.

FIGS. 5a) and 5b) show sections of a measurement chamber of an ultrasonic measuring device 1 according to the invention, wherein the measurement chamber in contrast to FIGS. 1 and 2 is not designed as a measuring tube, but rather as a measuring insert that can be inserted into a container B. Equivalent to embodiments shown in FIGS. 1 and 2, the metering chamber encompasses a measurement chamber volume and, as shown here, can have two open sides through which the medium can enter or exit the measurement chamber. Alternatively, a measurement chamber with, for example, only one open side is also conceivable. According to the invention, the measurement chamber is configured in the region of the reflection surface by means of a dissonant structure 17 in order to impede the excitation of Rayleigh waves and/or plate waves in the transition region to Rayleigh waves. The statements disclosed with reference to FIGS. 1 to 4 also apply to FIG. 5. In particular, in the region of the reflection surface, the measurement chamber outer wall 11.1 can, as an alternative or in addition to the dissonant structure 17, have indentations according to FIGS. 3a) to c) and 4a) and b) and/or a potting.

Figure 6A:
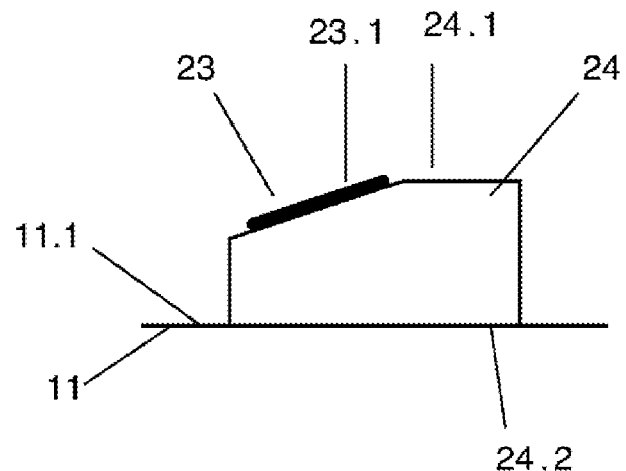
FIGS. 6a-6c show different ultrasonic transducers according to the present disclosure.

FIG. 6a) 6b) and 6c) show various ultrasonic transducers usable for an ultrasonic measuring device according to the invention, wherein the shown ultrasonic transducers are not exhaustive.

FIG. 6a) shows a side view of an ultrasonic transducer comprising a converter element 23.1, in particular a piezoelectric element 23.1 and a coupling element 24 having a first side 24.1 and a second side 24.2 facing away from the first side. The converter element is arranged on the first side of the coupling element, wherein the coupling element is acoustically and mechanically coupled to the measurement chamber wall by means of the second side.

Figure 6B:
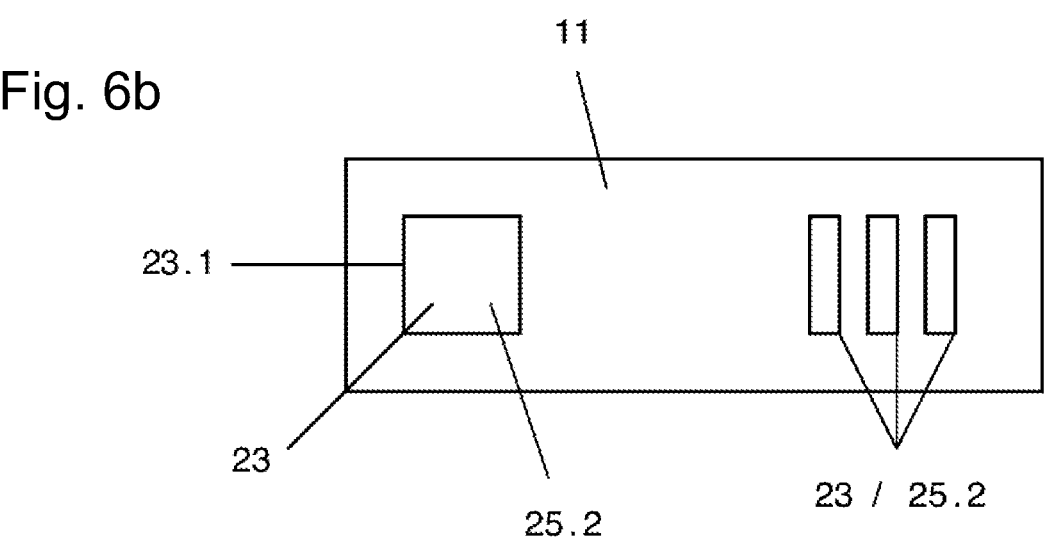

FIG. 6b) shows ultrasonic transducers with which a converter element 23, in particular a piezoelectric element or a magnetostrictive material 25.2 is applied to the measurement chamber wall. Alternatively, the measurement chamber wall can be piezoelectric or magnetostrictive, at least sectionally.

Piezoelectric elements can be forced to change an elongation by applying an electrical voltage pulse, or can be forced to generate an electrical voltage pulse by means of a mechanically/acoustically induced change in elongation. Piezoelectric elements are therefore suitable for generating and detecting ultrasound signals.

The at least one piezoelectric element can also be a component of an interdigital transducer.

Figure 6C:
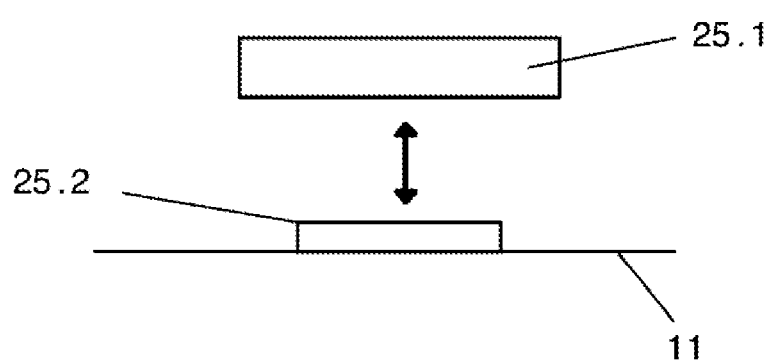

FIG. 6c) shows a side view of an ultrasonic transducer based on magnetostriction. A coil device 25.1 is configured to move the magnetostrictive material according to FIG. 6b) by means of electric fields and/or to detect its movements. Ultrasound converters based on magnetostriction are therefore suitable for generating and for detecting ultrasonic signals.

The coupling element, the piezoelements or the magnetostrictive material can be releasably connected mechanically to the measurement chamber wall, for example by pressing, or fixedly connected for example by gluing, soldering or welding.

Figure 7A:
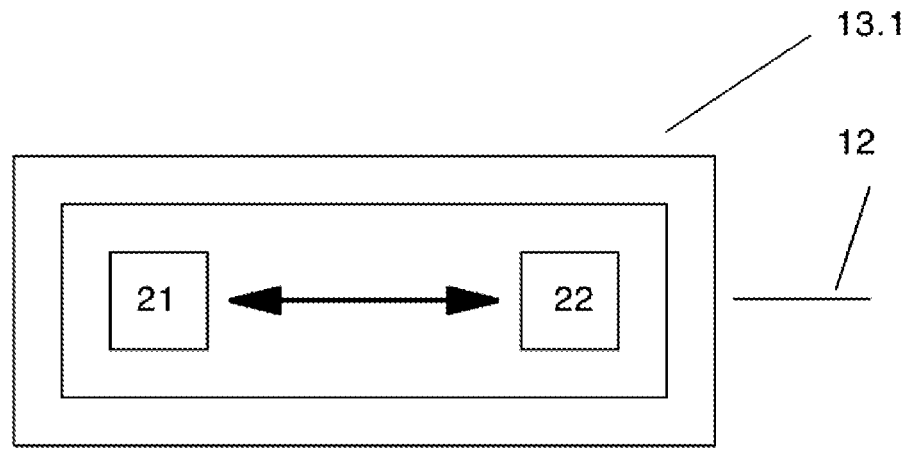
FIGS. 7a-7c show various ultrasonic transducer arrangements according to the present disclosure.

FIGS. 7a), b) and c) show various views of arrangement possibilities of ultrasonic transducer pairs comprising ultrasonic transducers 21, 22 on a first measurement chamber side 13.

FIG. 7a) shows an arrangement of an ultrasonic transducer pair. Ultrasonic signals transmitted between the ultrasonic transducers along the ultrasonic signal path can, for example, run in one plane. If the first measurement chamber side 13.1 is flat in the region of the ultrasonic transducers along with the reflection surface, the plane can run parallel and offset or obliquely to the measurement chamber axis 12.

Figure 7B:
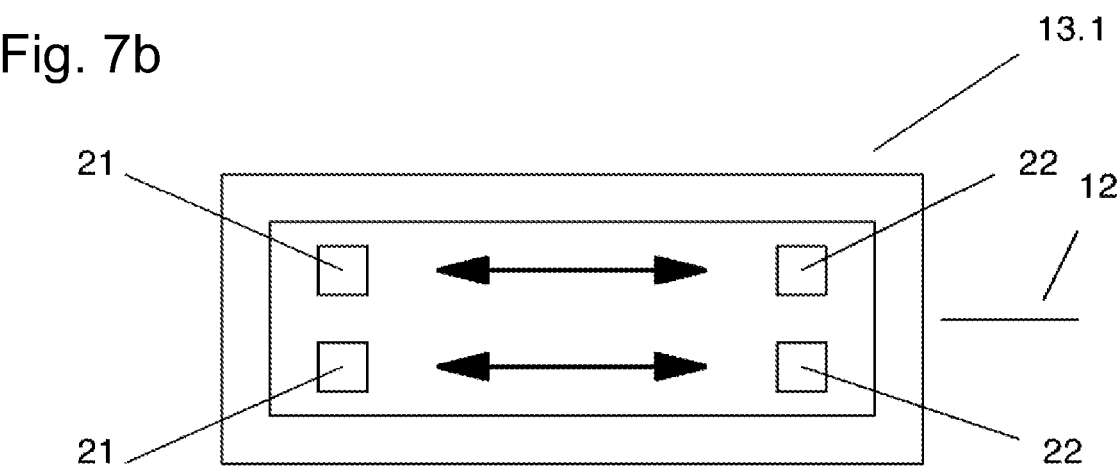

FIG. 7b) shows an arrangement of two ultrasonic transducer pairs that convey ultrasonic signals parallel to the measuring tube axis. In this case, it is necessary for the first measurement chamber side 13.1 to be flat in the region of the ultrasonic transducers and the reflection surface.

Figure 7C:
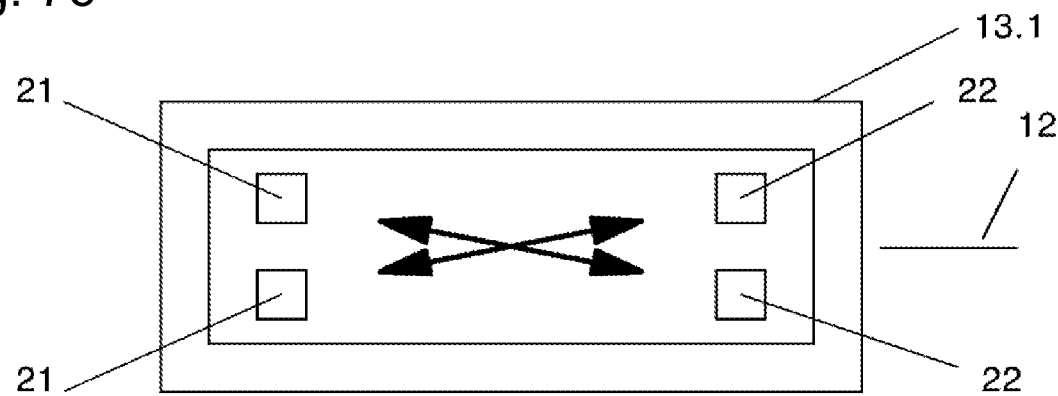

FIG. 7c) shows an arrangement of two ultrasonic transducer pairs, which conveyed ultrasonic signals obliquely to the measuring tube axis. In this case, it is necessary for the first measurement chamber side 13.1 to be flat in the region of the ultrasonic transducers. The reflection surface can be flat or curved.

The invention claimed is:

1. An ultrasonic measuring device for detecting a measurand of a medium, the measuring device comprising:
   a measurement chamber, which includes a chamber wall defining a volume and has a chamber longitudinal axis;
   at least one pair of ultrasonic transducers disposed on a first chamber side of the measurement chamber, wherein ultrasonic transducers of a pair of the at least one pair of ultrasonic transducers are configured to transmit ultrasound signals along an ultrasonic signal path between the ultrasonic transducers of the pair through the volume of the measurement chamber and to receive ultrasound signals, wherein the ultrasound signals have a central frequency,
   wherein the ultrasonic signal path includes at least one ultrasound signal reflection on at least one reflection surface, wherein a reflection surface of the at least one reflection surface is disposed on an inner chamber surface of the chamber wall opposite the first chamber side; and
   an electronic circuit configured to operate the at least one pair of ultrasonic transducers, to evaluate measurement signals generated by the at least one pair of ultrasonic transducers and to determine measurands of measurement errors,
   wherein the chamber wall in a region of the reflection surface opposite the first chamber side is configured to prevent a reflection of an ultrasonic signal of a chamber outer surface of the chamber wall in a direction of the ultrasonic signal path,
   wherein the chamber wall has, in the region of the reflection surface, a maximum wall thickness that is at least a first factor of 1.5 greater than a Rayleigh wavelength, associated with the central frequency, of the ultrasound signal in the chamber wall,
   wherein the chamber outer surface includes at least one indentation in the region of the reflection surface, wherein the at least one indentation extends parallel to the chamber longitudinal axis and includes indentation surfaces that are non-parallel to the reflection surface, and
   wherein an entirety of the at least one indentation has a width that corresponds at least to a width of the reflection surface multiplied by a second factor, which is greater than 0.7.

2. The measuring device of claim 1, wherein the first factor is 2.5.

3. The measuring device of claim 1, wherein the at least one pair of ultrasonic transducers is disposed on an inside of the measurement chamber,
   wherein the ultrasonic transducers of the pair are configured to transmit and receive ultrasonic signals via Lamb waves or plate waves in a transition region to Rayleigh waves in the chamber wall, wherein the ultrasonic transducers are configured to excite and/or detect the Lamb waves or plate waves in a coupling region of the chamber wall by at least one converter element.

4. The measuring device of claim 3, wherein the at least one converter element includes a piezoelectric element mechanically connected to the measurement chamber.

5. The measuring device of claim 4, wherein the piezoelectric element is connected to the measurement chamber by a glued, soldered, or welded connection or by a releasable connection.

6. The measuring device of claim 4, wherein the piezoelectric element is connected to the measurement chamber by a glued, soldered, or welded connection or by a releasable connection.

7. The measuring device of claim 3, wherein the ultrasonic transducer includes a coupling element having a first side opposite the measurement chamber and a second side facing the measurement chamber, wherein a piezoelectric element is disposed on the first side of the coupling element, and wherein the coupling element is releasably mechanically connected to the measurement chamber via the second side.

8. The measuring device of claim 3, wherein the at least one converter element comprises a coil device, wherein the measurement chamber comprises or bears a magnetostrictive or magnetically conductive material in the coupling regions, wherein the coil device is configured to generate and/or detect a deflection of the chamber wall via the magnetostrictive or magnetically conductive material.

9. The measuring device of claim 8, wherein the magnetostrictive or magnetically conductive material is connected to the measurement chamber by a glued, soldered, or welded connection or by a releasable connection.

10. The measuring device of claim 1, wherein the second factor is 0.9.

11. The measuring device of claim 1, wherein the at least one indentation of the chamber outer surface includes a plurality of indentations, which extend parallel to each other.

12. The measuring device of claim 11, wherein:
the plurality of indentations includes a first group and a second group of indentations, wherein the first group of indentations extend parallel to each other;
the second group of indentations run parallel to each other;
indentations of the first group are non-parallel to indentations of the second group; and
an orientation of the first group is at an angle of at least 20° to an orientation of the second group.

13. The measuring device of claim 1, the at least one indentation has, at least sectionally, a depth of at least one transverse wavelength of an ultrasonic signal in the chamber wall relative to the central frequency,
wherein an offset of two adjacent indentations is less than one wavelength of an ultrasonic signal in the chamber wall.

14. The measuring device of claim 1, wherein the chamber wall or the chamber outer surface of the chamber wall is, at least sectionally, an ultrasound signal-absorbing material.

15. The measuring device of claim 14, wherein the chamber wall includes a chamber structure, wherein the chamber structure includes different materials, wherein a first material is characterized by the chamber wall and is a plastic or a metal or a ceramic, and
wherein at least one second material is one of: a gas, a plastic, a metal, a gel, a foam, an aerogel, a vacuum, a composite including hollow glass spheres, a heavy metal powder, and a heavy metal oxide powder.

16. The measuring device of claim 1, wherein the chamber wall includes a dissonant structure disposed on the chamber outer surface in the region of the reflection surface or embedded in the chamber wall, wherein the dissonant structure is configured to impede generating Rayleigh waves in the region of the first reflection surface.

17. The measuring device of claim 1, wherein the dissonant structure comprises periodically or quasi-periodically, spatially varying acoustic impedances in a direction of a chamber longitudinal axis.

18. The measuring device of claim 17, wherein the acoustic impedances are made by using different materials, wherein a first material is characterized by the chamber wall and is a plastic, a metal or a ceramic, and
wherein at least one second material is one of: a gas, a plastic, a metal, a gel, a foam, an aerogel, a vacuum, a composite including hollow glass spheres, a heavy metal powder and heavy metal oxide powder.

19. The measuring device of claim 1, wherein the measurement chamber is configured to be inserted in a leak-tight manner into a container containing the medium via an opening in the container, or
wherein the measurement chamber is a measuring tube.

20. The measuring device of claim 1, wherein the measuring device is configured to measure at least one of the following media properties: a volume flow, a mass flow, a density, a viscosity, an acoustic damping, a sound velocity, a concentration of at least one media component, an acoustic dispersion, and/or measurands derived therefrom.

21. An ultrasonic measuring device for detecting a measurand of a medium, the measuring device comprising:
a measurement chamber, which includes a chamber wall defining a volume and has a chamber longitudinal axis;
at least one pair of ultrasonic transducers disposed on a first chamber side of the measurement chamber, wherein ultrasonic transducers of a pair of the at least one pair of ultrasonic transducers are configured to transmit ultrasound signals along an ultrasonic signal path between the ultrasonic transducers of the pair through the volume of the measurement chamber and to receive ultrasound signals, wherein the ultrasound signals have a central frequency,
wherein the ultrasonic signal path includes at least one ultrasound signal reflection on at least one reflection surface, wherein a reflection surface of the at least one reflection surface is disposed on an inner chamber surface of the chamber wall opposite the first chamber side; and
an electronic circuit configured to operate the at least one pair of ultrasonic transducers, to evaluate measurement signals generated by the at least one pair of ultrasonic transducers, and to determine measurands of measurement errors,
wherein the chamber wall in a region of the reflection surface opposite the first chamber side is configured to prevent a reflection of an ultrasonic signal of a chamber outer surface of the chamber wall in a direction of the ultrasonic signal path,
wherein the chamber wall has, in the region of the reflection surface, a maximum wall thickness that is at least a first factor of 1.5 greater than a Rayleigh wavelength, associated with the central frequency, of the ultrasound signal in the chamber wall,
wherein the chamber wall includes a dissonant structure disposed on the chamber outer surface in the region of the reflection surface or embedded in the chamber wall, wherein the dissonant structure is configured to impede generating Rayleigh waves in the region of the first reflection surface, wherein the dissonant structure comprises periodically or quasi-periodically, spatially varying acoustic impedances in a direction of a chamber longitudinal axis, and
wherein the acoustic impedances are made by using different materials, wherein a first material is characterized by the chamber wall and is a plastic, a metal or a ceramic, and wherein at least one second material is one of: a gas, a plastic, a metal, a gel, a foam, an aerogel, a vacuum, a composite including hollow glass spheres, a heavy metal powder, and heavy metal oxide powder.

* * * * *